US010009090B2

(12) United States Patent
Dussmann

(10) Patent No.: US 10,009,090 B2
(45) Date of Patent: *Jun. 26, 2018

(54) SYSTEM AND METHOD FOR REDUCING DESENSITIZATION OF A BASE STATION TRANSCEIVER FOR MOBILE WIRELESS REPEATER SYSTEMS

(71) Applicant: Andrew Wireless Systems GmbH, Buchdorf (DE)

(72) Inventor: Alfons Dussmann, Gansheim (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/412,454

(22) Filed: Jan. 23, 2017

(65) Prior Publication Data
US 2017/0134085 A1 May 11, 2017

Related U.S. Application Data

(63) Continuation of application No. 14/021,531, filed on Sep. 9, 2013, now Pat. No. 9,553,656, which is a
(Continued)

(51) Int. Cl.
H04B 7/155 (2006.01)
H04W 24/08 (2009.01)
H04W 88/08 (2009.01)

(52) U.S. Cl.
CPC ..... H04B 7/15528 (2013.01); H04B 7/15535 (2013.01); H04W 24/08 (2013.01); H04W 88/08 (2013.01)

(58) Field of Classification Search
CPC ........... H04B 7/15528; H04B 1/15535; H04W 24/08; H04W 88/08
(Continued)

(56) References Cited

U.S. PATENT DOCUMENTS 4,811,421 A 3/1989 Havel et al.
5,095,528 A * 3/1992 Leslie ................ H04B 7/15535
455/10
(Continued)

FOREIGN PATENT DOCUMENTS

CN 1728595 2/2006
CN 101595657 12/2009
(Continued)

OTHER PUBLICATIONS

Chinese Patent Office, "First Office Action from CN Application No. 201210189568.3", "from Foreign Counterpart to U.S. Appl. No. 13/472,618", dated Sep. 28, 2016, pp. 1-19, Published in: CN.
(Continued)

Primary Examiner — Hai V Nguyen
(74) Attorney, Agent, or Firm — Fogg & Powers LLC

(57) ABSTRACT

A repeater system including bi-directional amplifier circuitry that is configured for repeating signals between at least one device and a first signal source. Receiver circuitry is coupled with the amplifier circuitry provides at least one signal associated with at least one of a device or the first signal source or a second signal source. Controller circuitry is configured for monitoring a parameter of a provided signal that is reflective of a property of a signal source or a device. The monitored parameter is used to make a determination of whether repeated signals associated with the first signal source will desensitize the operation of the second signal source. The controller circuitry is also operable for adjusting the power level of the signals that are repeated by the bi-directional amplifier circuitry based on the determination that repeated signals will desensitize the operation of the second signal source.

20 Claims, 6 Drawing Sheets

Related U.S. Application Data continuation of application No. 13/472,618, filed on May 16, 2012, now Pat. No. 8,532,566.

(60) Provisional application No. 61/494,459, filed on Jun. 8, 2011.

(58) Field of Classification Search
USPC ................................................. 455/10, 11.1
See application file for complete search history.

(56) References Cited

U.S. PATENT DOCUMENTS

| | | | |
|---|---|---|---|
| 5,129,098 A | | 7/1992 | McGirr et al. |
| 5,341,398 A | | 8/1994 | DeRango et al. |
| 5,880,695 A | * | 3/1999 | Brown .................. H01Q 1/523 343/700 MS |
| 6,147,981 A | | 11/2000 | Prescott |
| 6,459,881 B1 | | 10/2002 | Hoder et al. |
| 6,647,244 B1 | | 11/2003 | Haymond et al. |
| 6,687,509 B2 | | 2/2004 | Schmutz et al. |
| 6,690,662 B1 | * | 2/2004 | Komara ............... H04B 7/2606 370/342 |
| 6,690,915 B1 | * | 2/2004 | Ito ....................... H04B 7/15535 370/492 |
| 6,862,430 B1 | | 3/2005 | Duffy et al. |
| 7,062,224 B2 | | 6/2006 | Baker et al. |
| 7,162,201 B2 | | 1/2007 | Yoon et al. |
| 7,260,415 B1 | | 8/2007 | Oh |
| 7,277,672 B2 | | 10/2007 | Duffy et al. |
| 7,406,300 B2 | | 7/2008 | Pan |
| 7,480,486 B1 | | 1/2009 | Oh et al. |
| 7,558,528 B2 | * | 7/2009 | King ........................ H04B 1/40 370/389 |
| 7,574,230 B1 | | 8/2009 | Oh et al. |
| 7,613,332 B2 | | 11/2009 | Enomoto et al. |
| 7,764,924 B1 | | 7/2010 | Smithey et al. |
| 7,783,318 B2 | | 8/2010 | Wilson et al. |
| 7,796,942 B2 | | 9/2010 | Duffy et al. |
| 7,957,693 B2 | * | 6/2011 | Shimizu ............. H04B 7/15585 370/310 |
| 7,974,573 B2 | * | 7/2011 | Dean .................. H04B 7/15578 375/213 |
| 7,990,904 B2 | * | 8/2011 | Proctor, Jr. ............ H04B 7/026 370/315 |
| 8,023,885 B2 | * | 9/2011 | Proctor, Jr. .......... H04B 7/1555 455/11.1 |
| 8,027,642 B2 | * | 9/2011 | Proctor, Jr. ........ H04B 7/15585 370/279 |
| 8,059,727 B2 | * | 11/2011 | Proctor, Jr. ............ H04B 7/022 375/260 |
| 8,060,009 B2 | * | 11/2011 | Gainey .............. H04B 7/15542 455/15 |
| 8,089,913 B2 | * | 1/2012 | Proctor, Jr. ........ H04B 7/15521 370/315 |
| 8,111,645 B2 | * | 2/2012 | Proctor, Jr. ........ H04B 7/15542 370/315 |
| 8,116,254 B2 | | 2/2012 | Sabat et al. |
| 8,122,134 B2 | * | 2/2012 | Proctor, Jr. ........ H04B 7/15542 370/315 |
| 8,150,447 B2 | | 4/2012 | Kazmi et al. |
| 8,228,878 B2 | * | 7/2012 | Larsson ............... H01Q 3/2605 370/335 |
| 8,331,995 B2 | * | 12/2012 | Hevizi ............. H04W 52/0203 455/507 |
| 8,498,234 B2 | * | 7/2013 | Proctor .............. H04B 7/15507 370/279 |
| 8,532,566 B2 | * | 9/2013 | Dussmann ......... H04B 7/15535 455/11.1 |
| 8,559,379 B2 | * | 10/2013 | Gainey .................. H04B 7/155 370/315 |
| 8,588,194 B2 | * | 11/2013 | Chen ...................... H04L 41/08 370/338 |
| 8,619,839 B2 | * | 12/2013 | Braz ...................... H04B 7/15 375/141 |
| 8,699,943 B2 | * | 4/2014 | Kummetz ............ H04B 7/2606 455/11.1 |
| 8,700,083 B2 | * | 4/2014 | Yavuz .................. H04W 52/40 370/318 |
| 8,712,461 B2 | * | 4/2014 | Yavuz .................. H04W 52/40 370/318 |
| 8,725,167 B2 | * | 5/2014 | Siomina ................ G01S 5/0036 455/456.1 |
| 8,743,713 B2 | * | 6/2014 | Terry ................. H04B 7/15535 370/252 |
| 8,750,786 B2 | * | 6/2014 | Larsson ............. H04B 7/15535 370/279 |
| 8,774,079 B2 | * | 7/2014 | Proctor, Jr. .............. H04B 7/04 370/315 |
| 8,837,559 B2 | * | 9/2014 | Jovanovic ............... H04L 27/26 375/211 |
| 8,849,190 B2 | * | 9/2014 | Hanson .............. H04B 7/15535 455/11.1 |
| 8,862,051 B2 | * | 10/2014 | Gan .................... H04B 7/15535 370/226 |
| 8,885,688 B2 | * | 11/2014 | Gainey ................ H04B 7/2606 370/293 |
| 8,909,279 B2 | * | 12/2014 | Yavuz .................. H04W 52/40 455/443 |
| 9,258,053 B2 | * | 2/2016 | Braz ....................... H04B 7/15 |
| 9,402,190 B2 | * | 7/2016 | Zhan ..................... H04W 16/26 |
| 9,467,877 B2 | * | 10/2016 | Hanson ............. H04B 7/15535 |
| 9,491,722 B2 | * | 11/2016 | Yavuz .................. H04W 52/40 |
| 9,553,656 B2 | * | 1/2017 | Dussmann ......... H04B 7/15535 |
| 2003/0123401 A1 | * | 7/2003 | Dean .................. H04B 7/15535 370/318 |
| 2003/0211828 A1 | * | 11/2003 | Dalgleish ........... H04B 7/15535 455/11.1 |
| 2003/0220075 A1 | | 11/2003 | Baker et al. |
| 2004/0137854 A1 | * | 7/2004 | Ge ........................ H03G 3/3042 455/78 |
| 2004/0146013 A1 | * | 7/2004 | Song .................. H04B 7/15507 370/279 |
| 2004/0219876 A1 | * | 11/2004 | Baker ................ H04B 7/15535 455/7 |
| 2004/0235417 A1 | * | 11/2004 | Dean .................. H04B 7/15564 455/10 |
| 2005/0014464 A1 | * | 1/2005 | Larsson ................. H04B 7/022 455/11.1 |
| 2006/0025072 A1 | | 2/2006 | Pan |
| 2006/0052066 A1 | * | 3/2006 | Cleveland .......... H04B 7/15571 455/101 |
| 2006/0205342 A1 | * | 9/2006 | McKay, Sr. .............. H04B 3/36 455/11.1 |
| 2007/0071128 A1 | | 3/2007 | Meir et al. |
| 2008/0058018 A1 | * | 3/2008 | Scheinert ........... H04B 7/15528 455/562.1 |
| 2008/0076437 A1 | | 3/2008 | Wilson et al. |
| 2009/0042593 A1 | * | 2/2009 | Yavuz .................. H04W 52/40 455/522 |
| 2009/0042594 A1 | * | 2/2009 | Yavuz .................. H04W 52/40 455/522 |
| 2009/0042595 A1 | * | 2/2009 | Yavuz .................. H04W 52/40 455/522 |
| 2009/0042596 A1 | * | 2/2009 | Yavuz .................. H04W 52/40 455/522 |
| 2009/0073918 A1 | | 3/2009 | Conforto et al. |
| 2009/0154390 A1 | * | 6/2009 | King ....................... H04B 1/40 370/315 |
| 2009/0161608 A1 | | 6/2009 | Steer et al. |
| 2009/0196215 A1 | | 8/2009 | Sabat et al. |
| 2009/0286471 A1 | * | 11/2009 | Ma ...................... H04B 7/2606 455/10 |
| 2009/0290526 A1 | | 11/2009 | Gainey et al. |
| 2010/0272057 A1 | * | 10/2010 | Chen ...................... H04L 41/08 370/329 |
| 2010/0279602 A1 | * | 11/2010 | Larsson ............. H04B 7/15535 455/7 |

(56) References Cited

U.S. PATENT DOCUMENTS

| | | | |
|---|---|---|---|
| 2011/0009056 A1* | 1/2011 | Hanson | H04B 7/15535 455/9 |
| 2011/0211649 A1 | 9/2011 | Hahn et al. | |
| 2011/0235568 A1* | 9/2011 | Esteves | H04B 7/15507 370/315 |
| 2011/0256857 A1 | 10/2011 | Chen et al. | |
| 2012/0009926 A1* | 1/2012 | Hevizi | H04W 52/0203 455/436 |
| 2012/0026040 A1* | 2/2012 | Hohne | H01Q 1/246 342/372 |
| 2012/0040696 A1* | 2/2012 | Siomina | G01S 5/0036 455/456.6 |
| 2012/0058719 A1* | 3/2012 | Gan | H04B 7/15535 455/10 |
| 2012/0099490 A1* | 4/2012 | Kummetz | H04B 7/15535 370/280 |
| 2012/0315894 A1* | 12/2012 | Dussmann | H04B 7/15535 455/424 |
| 2013/0177047 A1* | 7/2013 | Kwak | H04B 7/155 375/211 |
| 2013/0189921 A1* | 7/2013 | Maca | H03H 17/0216 455/9 |
| 2014/0011442 A1* | 1/2014 | Dussmann | H04B 7/15535 455/10 |
| 2014/0050253 A1* | 2/2014 | Jovanovic | H04L 27/26 375/211 |
| 2015/0016296 A1* | 1/2015 | Hanson | H04B 7/15535 370/252 |
| 2015/0147960 A1* | 5/2015 | Hanson | H04B 7/15528 455/23 |
| 2015/0207558 A1* | 7/2015 | Braz | H04B 7/15542 370/315 |
| 2016/0156403 A1* | 6/2016 | Oliver | H04B 10/25754 375/211 |
| 2017/0026897 A1* | 1/2017 | Hanson | H04B 7/15535 |

FOREIGN PATENT DOCUMENTS

| | | |
|---|---|---|
| EP | 2533433 | 3/2014 |
| WO | 2009007778 | 1/2009 |
| WO | 2010128901 | 11/2010 |

OTHER PUBLICATIONS

European Patent Office, "European Search Report for EP Application No. 12171041.2", "from Foreign Counterpart to U.S. Appl. No. 13/472,618", dated Nov. 16, 2012, pp. 1-6, Published in: EP.

European Patent Office, "European Search Report for EP Application No. 14151811.8", "from Foreign Counterpart to U.S. Appl. No. 14/021,531", dated Jun. 20, 2014, pp. 1-6, Published in: EP.

U.S. Patent Office, "Notice of Allowance", "from U.S. Appl. No. 13/472,618", dated May 8, 2013, pp. 1-16, Published in: US.

U.S. Patent Office, "Office Action", "from U.S. Appl. No. 13/472,618", dated Sep. 14, 2012, pp. 1-17, Published in: US.

U.S. Patent Office, "Final Office Action", "from U.S. Appl. No. 14/021,531", dated Nov. 19, 2014, pp. 1-5, Published in: US.

U.S. Patent Office, "Notice of Allowance", "from U.S. Appl. No. 14/021,531", dated Sep. 7, 2016, pp. 1-8, Published in: US.

U.S. Patent Office, "Office Action", "from U.S. Appl. No. 14/021,531", dated Jun. 27, 2014, pp. 1-20, Published in: US.

U.S. Patent Office, "Corrected Notice of Allowability", "from U.S. Appl. No. 14/021,531", dated Sep. 28, 2016, pp. 1-6, Published in: US.

U.S. Patent Office, "Corrected Notice of Allowability", "from U.S. Appl. No. 14/021,531", dated Dec. 1, 2016, pp. 1-6, Published in: US.

China Patent Office, "Notice of Granting Patent Right for Invention for CN Application No. 201210189568.3", "from Foreign Counterpart to U.S. Appl. No. 13/472,618", dated Apr. 6, 2017, pp. 1-2, Published in: CN.

\* cited by examiner

SYSTEM AND METHOD FOR REDUCING DESENSITIZATION OF A BASE STATION TRANSCEIVER FOR MOBILE WIRELESS REPEATER SYSTEMS

CROSS-REFERENCE TO RELATED APPLICATIONS

This application is a continuation of U.S. Non-Provisional application Ser. No. 14/021,531, filed Sep. 9, 2013, and entitled "SYSTEM AND METHOD FOR REDUCING DESENSITIZATION OF A BASE STATION TRANSCEIVER FOR AN IN-TRAIN REPEATER", which is a continuation of U.S. Non-Provisional application Ser. No. 13/472,618, filed May 16, 2012, and entitled "SYSTEM AND METHOD FOR REDUCING DESENSITIZATION OF A BASE STATION TRANSCEIVER FOR AN IN-TRAIN REPEATER", which is a non-provisional application that claims the priority of U.S. Provisional Patent Application No. 61/494,459, filed Jun. 8, 2011 and entitled "SYSTEM AND METHOD FOR REDUCING DESENSITIZATION OF A BASE STATION TRANSCEIVER FOR AN IN TRAIN REPEATER", which applications are incorporated herein by reference in their entireties.

FIELD OF THE INVENTION

The invention relates to mobile communication systems, such as repeaters and distributed antenna systems generally and, more specifically, to wireless repeater systems (repeater or distributed antenna systems) that are used in a mobile environment, such as on a train.

BACKGROUND

Repeaters, distributed antenna systems, and similar signal repeating systems are wireless communication systems that are used to extend coverage into areas where the radio frequency (RF) signal penetration from traditional base transceiver stations (BTS's) is limited or not present. Those low signal or no signal areas might be inside buildings, in tunnels, shadowed areas that are behind mountains, underground train systems, and various other isolated areas. Generally, applications for such repeater communication systems are for those situations where the repeater or distributed antenna system (DAS) is immobile and is mounted in a fixed location with respect to one or more base transceiver stations. In other applications, the area that has limited penetration of the RF signals is mobile. That is, the repeater or distributed antenna system is installed in a moving or mobile environment or conveyance such as a train, ship, car, bus, or airplane, for example.

One common mobile application for repeater systems is in a train car where the repeater system is used to compensate for the train's signal penetration loss. A typical train car repeater system includes a donor antenna positioned or mounted on the outside of the train car to provide a radio link with a donor site, such as a nearby base transceiver station, and a coverage antenna positioned in the interior of the train car to provide a radio link with mobile devices located in the extended coverage area inside the train car. The donor and coverage antennas are connected by a bi-directional amplifier that boosts the levels of the uplink and downlink radio signals handled by the repeater system so that the signals have sufficient strength to ensure that train passengers can use smart phones and other mobile devices without dropping calls and with the benefit of higher data rates.

Because repeater systems increase the level of uplink signals (e.g., signals from the mobile devices to the base station) through electronic amplification, the repeater system may also generate and transmit spurious signals due to intermodulation distortion caused by non-linearities in the bi-directional amplifier, for example. These spurious signal emissions, and in particular third order intermodulation product emissions, must be controlled to avoid interfering with other mobile communication systems. Third order intermodulation products will often create co-channel interference in adjacent frequency bands. This co-channel interference will usually result in the affected communication system needing a higher received signal level for the particular desired signal than would normally be necessary in order to function properly. Co-channel interference therefore, effectively desensitizes the affected communication systems. For this reason, the allowable out-of-band spurious emissions of wireless repeater systems are regulated by standards bodies such as the European Telecommunications Standards Institute (ETSI) and the 3rd Generation Partnership Project (3GPP) to ensure that such spurious emissions are kept below a desired level.

In a stationary environment, such a consideration takes advantage of the somewhat static signal conditions. Interference control requirements are typically met through proper selection of system components and configuration settings made at the time the repeater system is commissioned. For example, a stationary repeater system providing extended coverage for a distant BTS may use a directional donor antenna that is oriented toward a more distant donor BTS to reduce emissions in the direction of the nearby non-donor BTS.

However, in a mobile environment, the conditions are more dynamic. For example, the positions of donor and non-donor BTS's change with respect to the repeater system, as the train or other mobile platform moves. Therefore, a repeater system configuration that provides acceptable performance at one location of a moving mobile platform may cause unacceptable interference at another location. The mobile environment also places additional constraints on the repeater system design, since the repeater system must operate under changing and somewhat unpredictable environmental conditions.

One specific issue faced by in-train repeater systems involves desensitization of Global System for Mobile communication-Railway (GSM-R) base stations by a mobile repeater system. GSM-R is a secure signal platform that provides voice and data communication between train and railway communication centers. GSM-R is used by railway operating staff such as train drivers, engineers, dispatchers, shunting team members, and station controllers to provide a reliable method of communication. GSM-R base stations are typically deployed along the rail track right-of-way, so the train cars will occasionally pass within a few meters of various GSM-R base stations, as they travel on the track. In configuring such systems, GSM-R operators generally do not allow other GSM-900 service providers to co-locate base transceiver stations on the same towers or structures supporting GSM-R equipment. Therefore, when a train having an in-train repeater system passes a GSM-R base station along a track, the donor base station that is providing GSM-900 service to the riders in the train car is typically much farther away from the donor antenna of the repeater system than the GSM-R base station. In a worst-case (but not uncommon) scenario, the in-train repeater system will be near the signal coverage edge or limit of the donor GSM-900 base station as the train passes the GSM-R base station.

Therefore, the mobile repeater system will be operating at maximum signal gain in order to maintain signal contact with the donor base station. In such a scenario, the uplink signals transmitted by the in-train repeater system will be much stronger at the closer GSM-R base station than at the more distant donor base station.

This "near-far" condition for the mobile repeater system places greater than normal suppression requirements on the spurious emissions of an in-train repeater system. For this reason, an in-train repeater system that meets the suitable ETSI and 3GPP emissions standards may still cause significant interference with or desensitization of the near GSM-R base station. The spurious emissions of the in-train repeater system may therefore have to be suppressed even more than would normally be required in other types of repeater systems to avoid interfering with the much closer GSM-R base station. This problem is further aggravated due to the mission-critical nature of GSM-R communications, which increases the importance of reducing interference, or the possibility of interference, with GSM-R systems caused by the mobile repeater system.

Therefore, there is a need for improved systems and methods for reducing desensitization of certain base stations, such as GSM-R base stations, by in-train or other mobile repeater systems.

SUMMARY

A repeater system and method in accordance with embodiments of the invention include bi-directional amplifier circuitry that is configured for repeating signals between at least one device, such as a mobile device and a first signal source, such as a base transceiver station (BTS). Receiver circuitry is operatively coupled with the bi-directional amplifier circuitry and is configured to receive and provide signals from the mobile devices or from various signal sources, such as EGSM or GSM-R base transceiver stations. Controller circuitry that is coupled with the receiver circuitry is configured for monitoring a parameter of a provided signal that is reflective of a property of a signal source or a device. The signal parameter might be RSSI's from downlink signals from the BTS's or may be power and frequency parameters from uplink signals associated with a mobile device, for example. The monitored parameters are used to make a determination of whether repeated signals associated with the first signal source will desensitize or adversely affect the operation of the second signal source. If there is a determination that repeated signals will desensitize the operation of the second signal source, such as a GSM-R base transceiver station, for example, the power level of the signals that are repeated is adjusted and more specifically reduced to avoid desensitizing the operation of the GSM-R base transceiver station.

In one embodiment, the RSSI value associated with a downlink signal from the BTS that might be affected is used and compared to a threshold to determine if the power level should be adjusted for the repeater system. In an alternative embodiment, the RSSI values associated with downlink signals from each of the BTS implementing the repeater and the BTS that might be affected are used. A difference between the two RSSI values is then compared to a threshold to determine if the power level should be adjusted for the repeater system. In still another embodiment, the uplink signal from a mobile device is evaluated to determine if the frequency and power level of the uplink signal indicate that certain intermodulation products of the signal will fall in the frequency band of the BTS that might be affected.

DETAILED DESCRIPTION

The examples disclosed herein of an adaptive repeater system for use in a mobile environment are exemplary of the invention and do not limit the scope of the invention. One skilled in the art will recognize a variety of applications and embodiments of the invention from the disclosure herein. Illustration and discussion are for an exemplary repeater system, such as a conventional repeater device, or a distributed antenna system, or some other system that transmits, receives, and/or otherwise repeats communication signals between a signal source (e.g., a base station transceiver (BTS)), and mobile equipment (e.g., mobile phones, mobile computer devices, or other mobile device).

Figure 1:
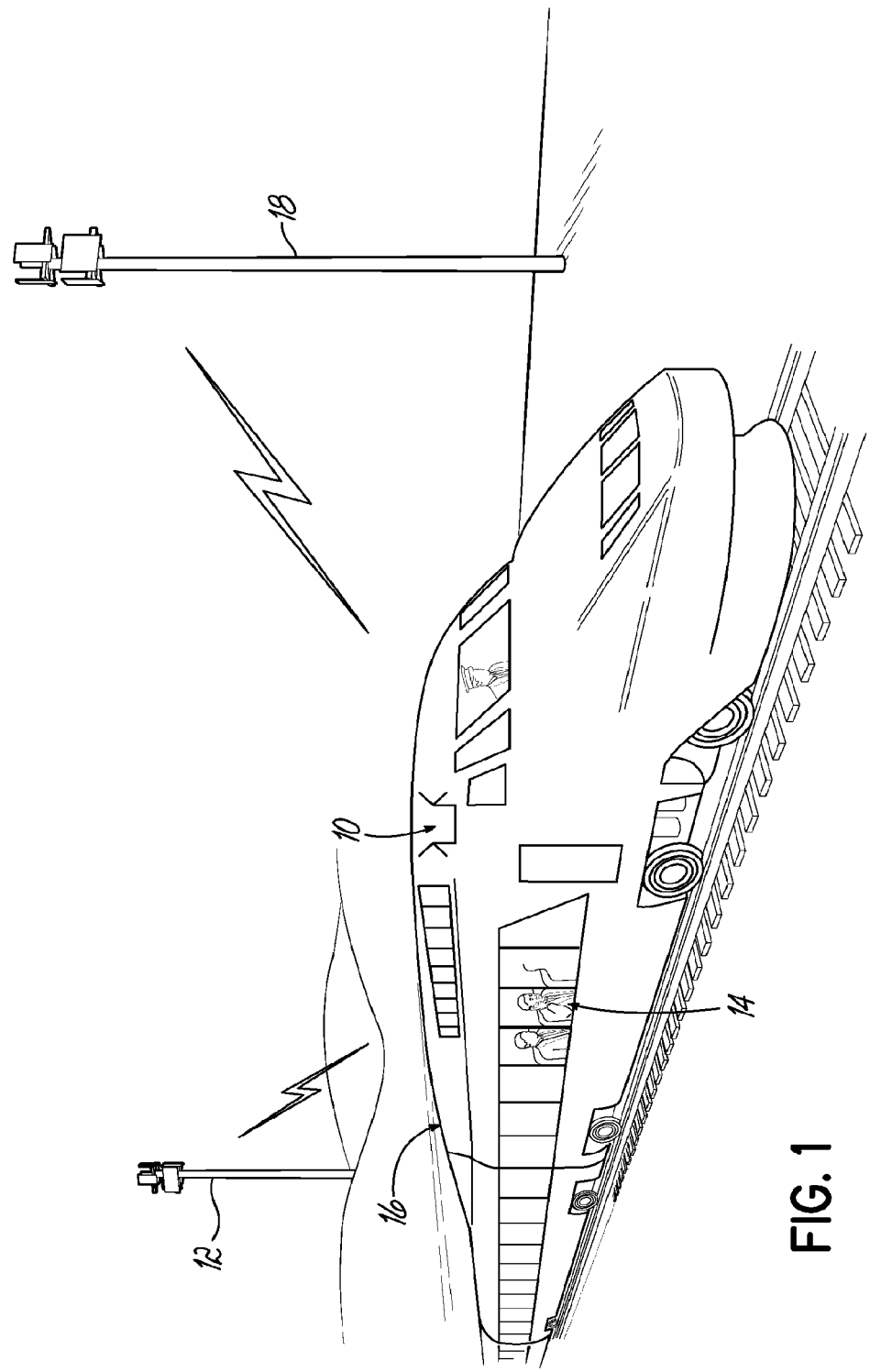
FIG. 1 illustrates a repeater system for use in a mobile environment in accordance with aspects of the invention.

FIG. 1 shows an exemplary mobile repeater system 10 deployed in a mobile platform, such as a moving train, that acts as part of a larger mobile communication network by repeating signals and facilitating communication between one or more BTS's 12 belonging to a first communication system, such as a GSM-900 system, and one or more mobile devices, computers, or stations 14 that are in use in a mobile platform or moving environment, such as on a train 16. As the train moves along its track, the repeater system 10 may also communicate with and receive downlink signals from one or more BTS's 18 belonging to a second communication system operating on frequencies different from those used by the first BTS 12, such as a GSM-R system. Train cars and other mobile vessels used for transportation are often made of metal and other such insulative materials that shield the interior spaces or compartments from external RF signals. The repeater system 10 receives the downlink signals from the first BTS 12 and rebroadcasts—or repeats—the RF signals inside the passenger compartments of the train 16 at a level suitable for reception by the mobile device 14 so that a user of the device may interface with the network.

The repeater system 10 also receives the uplink RF signals from the mobile device 14 and repeats those signals outside the train 16 at a level that allows the BTS 12 to communicate with the mobile device 14. That is, the repeater system 10 provides bi-directional communications between signal sources and the mobile devices. In a like fashion, the repeater system 10 may also repeat downlink and uplink signals associated with the second BTS 18, depending on whether the repeater operator wants to enhance the coverage of the additional communications system to which BTS 18 belongs. The repeater system 10 thereby extends or improves communication system coverage in the mobile environment, such as the passenger compartments of the train 14.

Figure 2:
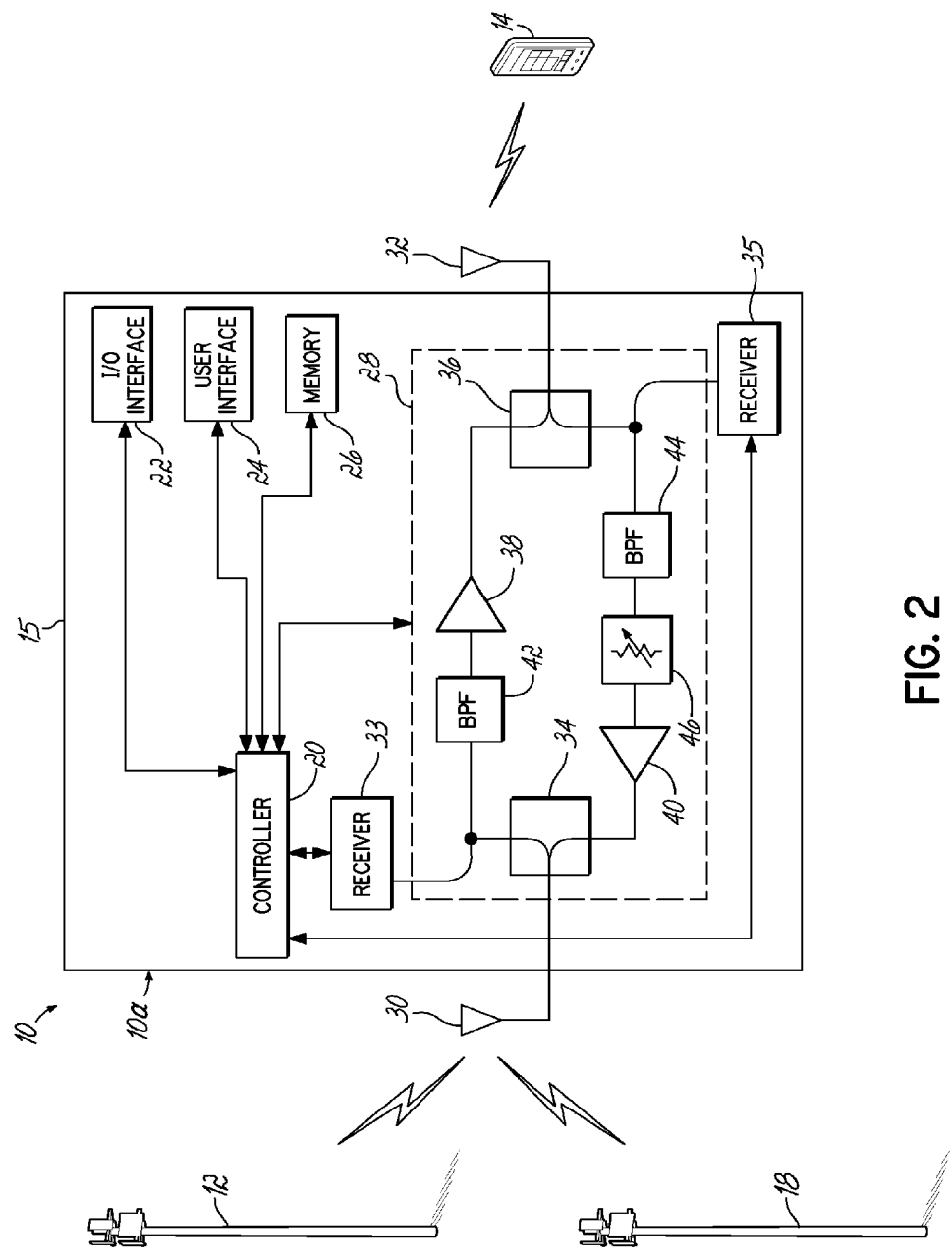
FIG. 2 is a diagram illustrating components of an exemplary repeater system in accordance with an embodiment of the invention.
Figure 2A:
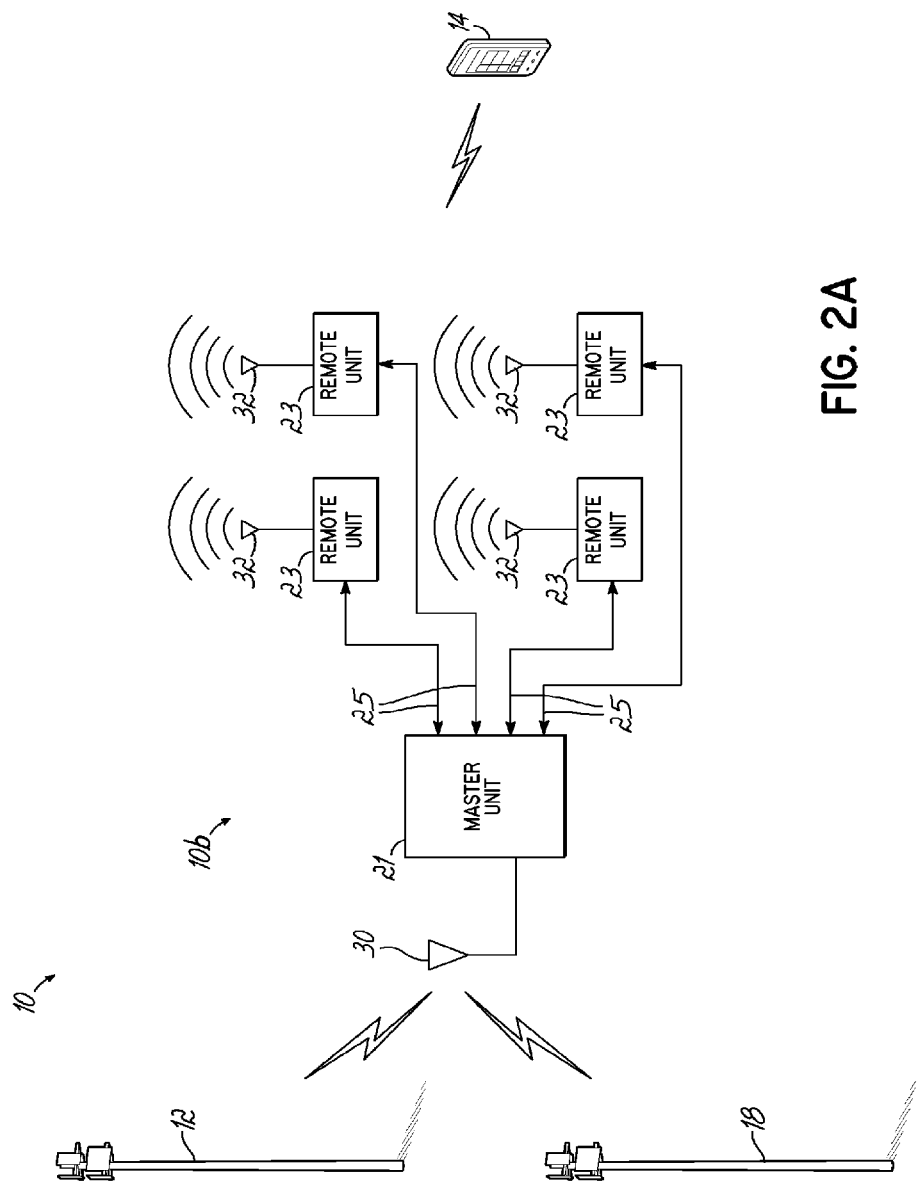
FIG. 2A is a diagram illustrating components of another exemplary repeater system in accordance with an embodiment of the invention.

FIG. 2 illustrates a diagrammatic view of an exemplary embodiment of a mobile repeater system 10, as used and shown in FIG. 1. The repeater system 10 in FIG. 2 is in the form of a specific repeater device 10a that has a donor antenna 30, a coverage antenna 32, and operational electronics 15 that couple the antennas 30, 32. In some repeater devices 10a, the electronics are contained within a unitary housing. Alternatively, the repeater system 10 of the invention might be implemented in a distributed system, such as a distributed antenna system (DAS) indicated specifically as system 10b, as illustrated in FIG. 2A and discussed below. In a DAS system 10b, the one or more donor antennas 30 are generally coupled to a main unit or master unit 21 that is coupled to a plurality of distributed remote units or antenna units 23, that are distributed throughout the mobile environment, such as in the different compartments or cars of a train, for example. The various remote units 23 are coupled to the master unit 21 with suitable communication links 25, such as coaxial or fiber-optic cables. The invention is described herein with respect to an embodiment where the various hardware components of the electronics 15 are illustrated as located in a common location, such as a repeater housing or housing for a master unit, but it will be understood by those of ordinary skill in the art that the components might be distributed throughout the repeater system 10 as desired to implement the invention. The exemplary hardware configuration is described below with respect to the embodiment of FIG. 2.

The repeater system 10 includes controller circuitry 20, an input/output (I/O) interface 22, a user interface 24, memory 26, bi-directional amplifier circuitry 28, a donor antenna 30, a coverage antenna 32, and receiver circuitry 33, 35. The I/O interface 22 and user interface 24 may provide a mechanism whereby the repeater system operator may communicate with and program the controller circuitry 20 and/or other repeater system components. The repeater system operator may thereby configure the repeater system 10 as desired by setting operational parameters within the repeater system such as filter frequencies, amplifier gains, or any other parameter. The I/O interface 22 and user interface 24 may also provide system status information and alarms to notify the system operator of the operational status of the repeater system 10.

The donor antenna 30 is operatively coupled to a coverage antenna 32 by the bi-directional amplifier circuitry 28. The bi-directional amplifier circuitry 28 is configured for repeating signals between at least one device and one or more signal sources. Circuitry 28 may include one or more duplexers 34, 36, downlink amplifier circuitry 38, uplink amplifier circuitry 40, downlink filter circuitry 42, uplink filter circuitry 44, and a variable attenuator 46, which may be a step attenuator used to adjust the composite output power of the uplink amplifier 40. The duplexers 34, 36 separate the downlink signal from the uplink signal, which is typically in a different frequency band from the downlink signal. The duplexers 34, 36 thereby allow signals from a single donor antenna 30 and/or a single coverage antenna 32 to be separately processed by the bi-directional amplifier circuitry 28. In alternative embodiments of the invention, multiple donor and coverage antennas and signal paths may be used for handling uplink and downlink signals separately, in which case the duplexers 34, 36 may be omitted. The filter circuitry 42, 44 may include operator adjustable bandpass filters configurable so that only the desired frequencies that are to be repeated pass though the bi-directional amplifier circuitry 28. The filter circuitry 42, 44 may thereby allow the repeater system operator to choose which cellular carriers and signal sources may have their signals repeated inside the extended coverage area. Filter circuitry 42, 44 may also improve the performance of the repeater system 10 by reducing transmitted noise and other interference.

The controller circuitry 20 is operatively coupled to the bi-directional amplifier circuitry 28, and may be configured to adjust the operational parameters of the bi-directional amplifier circuitry 28 based on information obtained from one or more combinations of the I/O interface 22, the user interface 24, the memory 26, the bi-directional amplifier circuitry 28, and/or the receiver circuitry 33 in accordance with the invention. The operational parameters adjusted by the controller circuitry 20 may include, but are not limited to, the gain of downlink amplifier circuitry 38, the gain of uplink amplifier circuitry 40, the operational frequencies of the filter circuitry 42, 44, and the attenuation settings of the variable attenuator 46. In accordance with aspects of the invention, the controller circuitry is operable for adjusting the power levels of the signals repeated by the amplifier circuitry.

To provide downlink coverage inside the train 16, the donor antenna 30 receives signals from one or more donor BTS's 12 or signal sources. The donor antenna 30 is electrically coupled to the donor side duplexer 34, which directs the downlink signals to the appropriate downlink filter circuitry 42. The amplitude of noise and signals which are outside the downlink frequency band of the cellular provider operating the donor BTS 12 may be reduced by the downlink filter circuitry 42 so that the performance of the downlink amplifier circuitry 38 is not adversely affected by out of band signals. The downlink filter circuitry 42 may thereby reduce system interference, and may also block mobile devices 14 within the extended coverage area from using undesired cellular systems. The filtered signal is amplified by the downlink amplifier circuitry 38 to a sufficient level to complete the downlink path, and is coupled to the coverage antenna 32 through the coverage side duplexer 36. The downlink signal from the donor BTS 12 is thereby provided to the extended coverage area with sufficient power to complete the downlink path between the donor BTS 12 and one or more mobile devices 14.

Improved uplink coverage is provided by the repeater system 10 in a similar manner as downlink coverage. The coverage antenna 32 receives signals that are transmitted by the mobile devices 14. These signals are provided to the uplink filter circuitry 44 by the coverage side duplexer 36. The filtered signals pass through the variable attenuator 46 and are amplified by the uplink amplifier circuitry 40, which provides signals with sufficient strength to the donor antenna 30 through the donor side duplexer 34 to complete the uplink path to the donor BTS 12. As the train 14 travels along the track, the location of the BTS's relative the repeater system and the distance between the mobile repeater system 10 and the first and second BTS's 12, 18 will change. These changes in distance will in turn cause the path loss between the BTS's 12, 18 and the donor antenna 30 to vary as the train 14 moves.

To maintain the uplink signal levels received by the donor BTS 12 at a level that provides a network connection of sufficient quality, the mobile devices 14 in the train will typically increase their output power to compensate for increased path losses as the train 14 moves away from the donor BTS 12. As the train 14 reaches the edge of the donor BTS coverage area, any mobile devices 14 engaged in communication with the donor BTS 12 will typically be transmitting at their maximum output power. As a result of this increased mobile device output power, the composite power output of the uplink amplifier circuitry 40 will also increase so that the repeater system 10 will typically be transmitting at its maximum rated output power in the uplink path back to the BTS 12. The increased output power demands on the uplink amplifier circuitry 40 may result in increased spurious emissions by the repeater system 10. These spurious emissions may, for example, be associated with third order intermodulation products generated by the interaction of multiple mobile device uplink signals with non-linearities in the uplink amplifier circuitry 40. Thus, at the coverage edge of the GSM BTS 12, the power level of the spurious emissions of the repeater system 10, resulting from third order intermodulation products, may be at or near their maximum power level.

The first and second BTS's 12, 18 may be BTS's used in any number of communications systems, and embodiments of the invention are not limited to a specific type of communications system or a specific frequency band. However, for the purposes of discussion, we will now assume a specific example where the first BTS 12 is a donor BTS operating in the extended GSM-900 (or EGSM) frequency band, and the second BTS 18 is a BTS operating in the adjacent GSM-R frequency band used for rail communication. In such a scenario, a repeater system 10 providing extended coverage in the EGSM band in the train will typically produce third order intermodulation products that fall into the uplink band of the GSM-R band, creating potential interference signals in the GSM-R band. Thus, at the edge of the donor BTS coverage area, the repeater system 10 may be producing in-band GSM-R spurious signals at a maximum power level. This may desensitize the GSM-R base station. The actual levels and frequencies of the spurious signals will depend in part on the linearity of the uplink amplifier circuitry 40, which is often characterized by the third order intercept point, as well as the number and frequency of uplink signals that are being transmitted.

If the second BTS 18 is sufficiently far from the repeater system 10 in the moving train, the path loss between the donor antenna 30 and the second BTS 18 will usually provide sufficient attenuation of the in-band spurious emissions to prevent desensitization of the second BTS 18. However, if the train 14 is relatively close to the second BTS 18 while simultaneously located at the coverage edge of the donor BTS 12, the spurious emissions incident on the second BTS 18 may be at a power level sufficient to desensitize the receiver circuitry in the second BTS 18. Therefore, whether the repeater system is interfering with the second BTS 18 depends on both the composite output power of the repeater 10 and the path loss between the repeater 10 and the second BTS 18.

The output power (and thus the power level of the spurious emissions) of the repeater system 10 thus depends at least in part on the path loss between the donor antenna 30 and the first or donor BTS 12. Likewise, the resulting level of interference produced at the second BTS 18 by the spurious emissions of the repeater system 10 depends on the path loss between the donor antenna 30 and the second BTS 18. Therefore, in accordance with one aspect of the invention, it has been determined that the amount of interference the repeater system 10 is likely producing at the second BTS 18 can be estimated based on the path loss between the donor antenna 30 and the first BTS 12 and the path losses between donor antenna 30 and the second BTS 18. One way to estimate the uplink path losses between the repeater 10 and the BTS's 12, 18 is to measure the downlink signal strength of the BTS's 12, 18 at the repeater system 10. This downlink signal strength measurement may be provided to the controller circuitry 20 by the receiver circuitry 33 in the form of a parameter of the received downlink signal, such as received signal strength indicator (RSSI).

In accordance with one aspect of the invention, the RSSI values of the various BTS's 12, 18 are monitored and measured. The RSSI values are then evaluated and used to determine how the repeater system is to be controlled to reduce the effects of any interference.

In one aspect of the invention, the difference between the monitored levels of the RSSI of the various BTS's is determined, and, as long as the RSSI of the first BTS 12 providing service in the EGSM band and the RSSI of the second BTS providing service in the GSM-R band differ by an amount or value within or below a first threshold, such as 35 dB for example, no significant desensitization will occur. That is, if the difference between the RSSI's of the first and second BTS's 12, 18 is less than 35 dB, the path losses between the donor antenna 30 and the BTS's 12, 18 are sufficiently similar, or are close enough, so that no significant desensitization of the second BTS 18 will occur. Therefore, the repeater system is not significantly adjusted with respect to its output power levels for the repeated signals. In accordance with another aspect of the invention, if the RSSI value of the GSM-R BTS (BTS 18 in the current example) is below a second threshold, such as −30 dBm for example, the path loss between the donor antenna 30 and the GSM-R BTS is sufficient such that the repeater system will not significantly desensitized the GSM-R BTS, even when the EGSM uplink signals are being transmitted at the repeater's maximum output power. Therefore, the repeater system and its output power levels will not be significantly adjusted even if the BTS's are sufficiently apart and the BTS 12 is transmitting at maximum power. The noted first and second RSSI thresholds given in the described example will vary depending on the linearity of the uplink amplifier 40 and other factors, such as the number of mobile devices transmitting. Thus, embodiments of the invention are not limited to a particular set of RSSI measurements or values, determined path losses, or threshold values.

Figure 3:
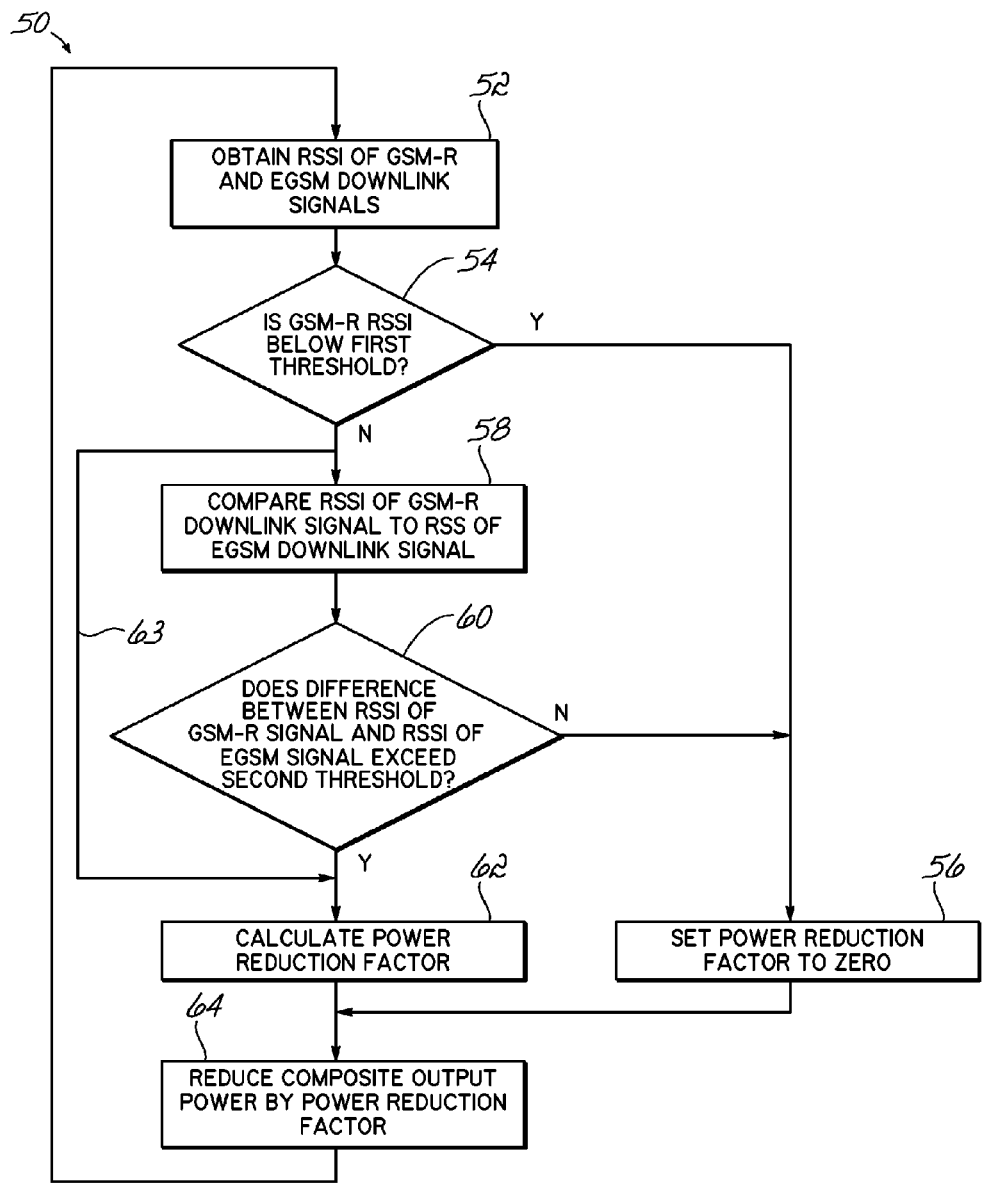
FIG. 3 is a flowchart illustrating an exemplary process for reducing the composite output power of the repeater system in FIG. 1 in response to measured RSSI signals in accordance with an embodiment of the invention.
Figure 4:
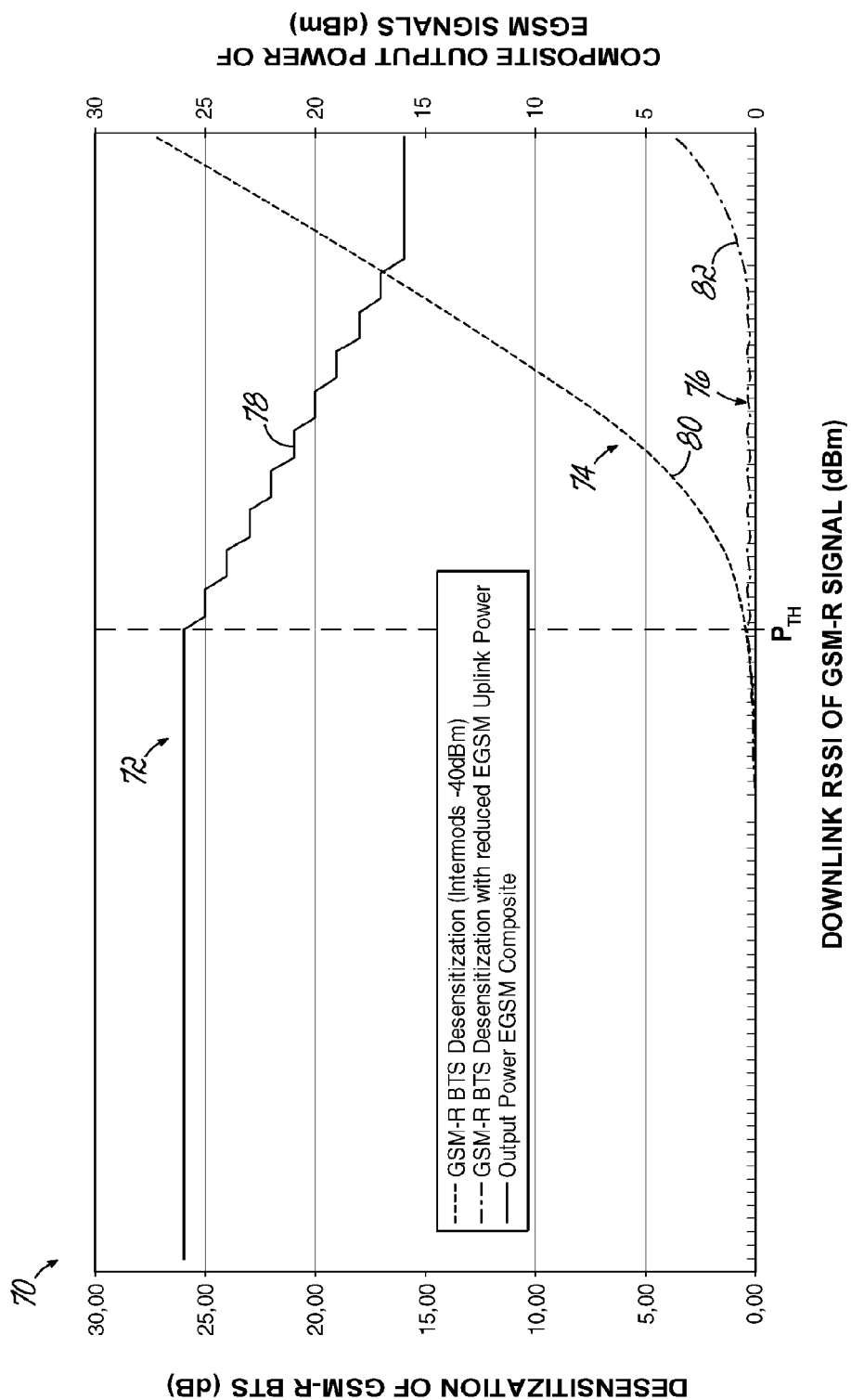
FIG. 4 graphical chart illustrating the reduction in the composite output power and the effect on the desensitization of a GSM-R base station.

Referring now to FIGS. 3 and 4, a flow chart 50 is presented illustrating an intelligent uplink power control method in a repeater system in accordance with an embodiment of the invention. The accompanying graphical diagram 70 illustrates exemplary relationships between: (1) the composite output power of the repeater system 10, as represented by plot line 72, (2) the desensitization of a GSM-R BTS by a repeater system lacking the inventive intelligent uplink power control feature, as represented by plot line 74, and (3) the desensitization of the GSM-R BTS by a repeater system including the inventive intelligent uplink power control feature, as represented by plot line 76. The flowchart 50 is implemented as a series of steps that may generally be handled in software by controller circuitry 20 and its associated processor hardware. The circuitry 15 of the invention, and specifically controller circuitry 20, will include one or more processors and suitable memory (not shown) that execute software as appropriate to control the operation of the repeater system 10. The processor hardware of controller circuitry may include one or more microprocessors, digital signal processors, or other processing units or logic circuits to execute software stored in memory, such as read-only-memory (ROM) or random access memory (RAM), or other memory to control the repeater system. The software and software applications or program code are executed to provide the functionality of the invention as described herein.

The controller circuitry 20 monitors a parameter of a signal provided to receive circuitry from at least one of the signal sources (BTS's) or device 14. The parameter is reflective of a property of the signal source, such as the strength of the signal or the location of the source or path loss from the source to repeater system 10. In one embodiment, as shown in FIG. 3, in block 52, the controller circuitry 20 monitors and obtains the RSSI values of the GSM-R and EGSM downlink signals. The receiver circuitry 33 provides the signal monitored by the controller circuitry, such as the downlink signals of the BTS's. The RSSI levels may be provided to the controller circuitry 20 by the receiver circuitry 33, which may scan the entire GSM-R and EGSM bands at a rate that provides an adequate response time by the controller circuitry 20 and the intelligent uplink power control feature of the invention. To this end, the receiver circuitry 33 may scan the GSM-R and EGSM bands every 150 mS or at some other rate as appropriate.

As noted, in block 54, in one embodiment of the invention, the controller compares the RSSI of the GSM-R downlink signal to a first selected threshold, which may vary depending on the characteristics of the repeater system, such as the repeater's third order intercept point (IP3), the maximum rated composite output power, and/or the number of transmitting mobile devices 14 engaging the repeater system. A typical value for the first selected threshold might be −30 dBm, for example. If the RSSI value of the GSM-R downlink signal is below the first selected threshold ("Yes" branch of decision block 54) the path loss between the repeater system 10 and the GSM-R BTS 18 is considered sufficiently high such that the repeater system 10 will not generally desensitize the GSM-R BTS 18 with any interference signals, such as uplink signals from the repeater system to BTS 12, even at maximum output power levels of the repeater system. That is, the BTS 18 may be sufficiently far away from the mobile repeater system 10 that interference desensitivity is unlikely, regardless of the location of the BTS 12 with respect to BTS 18 at that time or the train position relative the BTS's. The controller circuitry 20 will thus proceed to block 56, where the power reduction factor is set to zero, or there is no power level reduction.

If the RSSI of the strongest GSM-R downlink signal is above the first threshold or greater than −30 dBm, for example, ("No" branch of decision block 54), the path loss between the repeater system 10 and the GSM-R BTS 18 is not sufficient or may not be sufficient to guarantee that the BTS 18 will not be desensitized by spurious emissions from the repeater system 10 associated with communications with BTS 12. That is, the GSM-R BTS 18 is somewhat close to the mobile repeater system 10 at that time, and thus, might be adversely affected.

In one embodiment of the invention, a reduction would occur in the output signal power level of repeater system 10, based only on the GSM-R RSSI value determination. Therefore, from block 54, the control flow would proceed to block 62 through path 63 and a power reduction factor for the repeater system would be calculated as discussed herein for reducing the power level of the repeater system. The composite output power for the repeater system 10 in the EGSM uplink path would then be reduced by the power reduction factor as noted in block 64.

In an alternative embodiment of the invention, after the GSM-R RSSI value is determined and evaluated, further conditions may be monitored and detected to determine if the uplink output power of repeater system 10 should be adjusted, even if the strongest GSM-R downlink signal is above the first threshold ("No" in block 54). That is, other parameters of signals provided to the receiver circuitry might be monitored. To that end, the control flow might optionally proceed to block 58 to look at the RSSI value differences between the RSSI's associated with the two bands. That is, receiver circuitry 33 provides downlink signals for both BTS's 12, 18. The parameters for those signals, such as RSSI values, are monitored. With a somewhat closely located GSM-R BTS 18 as indicated by block 54, the repeater system may optionally evaluate at what power level the repeater system and mobile devices might be transmitting. As noted in block 58, the controller circuitry 20 compares the monitored RSSI value of the GSM-R downlink signal to the monitored RSSI value of the EGSM downlink signal. The controller circuitry then determines the difference value or delta between those monitored or measured RSSI signals from the BTS's 12, 18. Those RSSI signals will provide an indication of the distance of BTS 12 from repeater system 10, or other signal conditions that might exist to indicate if the repeater system 10 is operating at its maximum power relative to BTS 12 and relative to a possibly closely located GSM-R BTS 18. If the difference value between the RSSI value of the GSM-R signal and the RSSI value of the EGSM signal does not exceed a second threshold value ("No" branch of decision block 60), the output power of the repeater system does not need to be adjusted. That is, the downlink signal from the EGSM BTS 12 is strong enough relative to a close GSM-R BTS 18 that the mobile devices and repeater system 10 will not be transmitting at their maximum power, and thus, would not likely interfere with BTS 18, even though it is closely located to the repeater system. The controller circuitry 20 will thus proceed to block 56, where the power reduction factor is set to zero as before.

If, on the other hand, the difference value or difference between the RSSI value of the GSM-R signal and the RSSI value of the EGSM signal does exceed the second threshold ("Yes" branch of decision block 60), the controller circuitry 20 proceeds to block 62 where the power reduction factor is calculated for reducing the power level of the repeated signals, such as the uplink signals from repeater system 10. A typical value for the second threshold might be about 35 dB. That is, power reduction would occur if the signal differences of the RSSI values exceed 35 dB. The output power level in the uplink path will then be reduced for repeater system 10, as noted in block 64.

In one embodiment of the invention, the system monitors the RSSI of the BTS's to make a determination with respect to the proximity of the BTS to the repeater system, as well as the possible output uplink power that would be generated by the mobile devices and repeater system based upon that proximity. More specifically, if the RSSI value for a signal of a BTS is relatively low, such as the RSSI of the EGSM BTS 12, then an assumption is made that the BTS 12 is far enough away that mobile devices will be broadcasting at a high level in the uplink path, and thus, create a high uplink output power from the repeater system. Such a scenario would not be a problem when the GSM-R BTS 18 is also far enough away from the mobile repeater system (Block 54). However, if the GSM-R BTS 18 is close to the repeater system, as indicated by the first threshold as illustrated in Block 54 of FIG. 3, then it may be necessary to adjust the uplink output power as one option (proceed directly to block 62). Alternatively, the invention would monitor other system signal parameters, as another option (blocks 58, 60). That is, even with a close GSM-R BTS 18, there still may not be a need to adjust the output power level of the repeater system 10. If the EGSM BTS 12 is also close to the repeater system (RSSI difference between BTS's does not exceed the second threshold), then presumably, the mobile devices will not be transmitting at their maximum power level and the uplink power level of the repeater system is also lower or not at a maximum power level. Therefore, the repeater uplink signals generally would not then interfere with, or desensitize the GSM-R BTS 18. Conversely, if the difference between the RSSI signals of those paths exceeds the second threshold, then presumably the more distant BTS 12 is far enough away such that mobile devices and repeater system 10 may be transmitting at an uplink power level that is high enough that it may detrimentally affect the GSM-R BTS 18. In such a case, the uplink output power level of the repeater system must be adjusted in accordance with the invention. The output power level will be reduced by some power reduction factor.

Figure 3A:
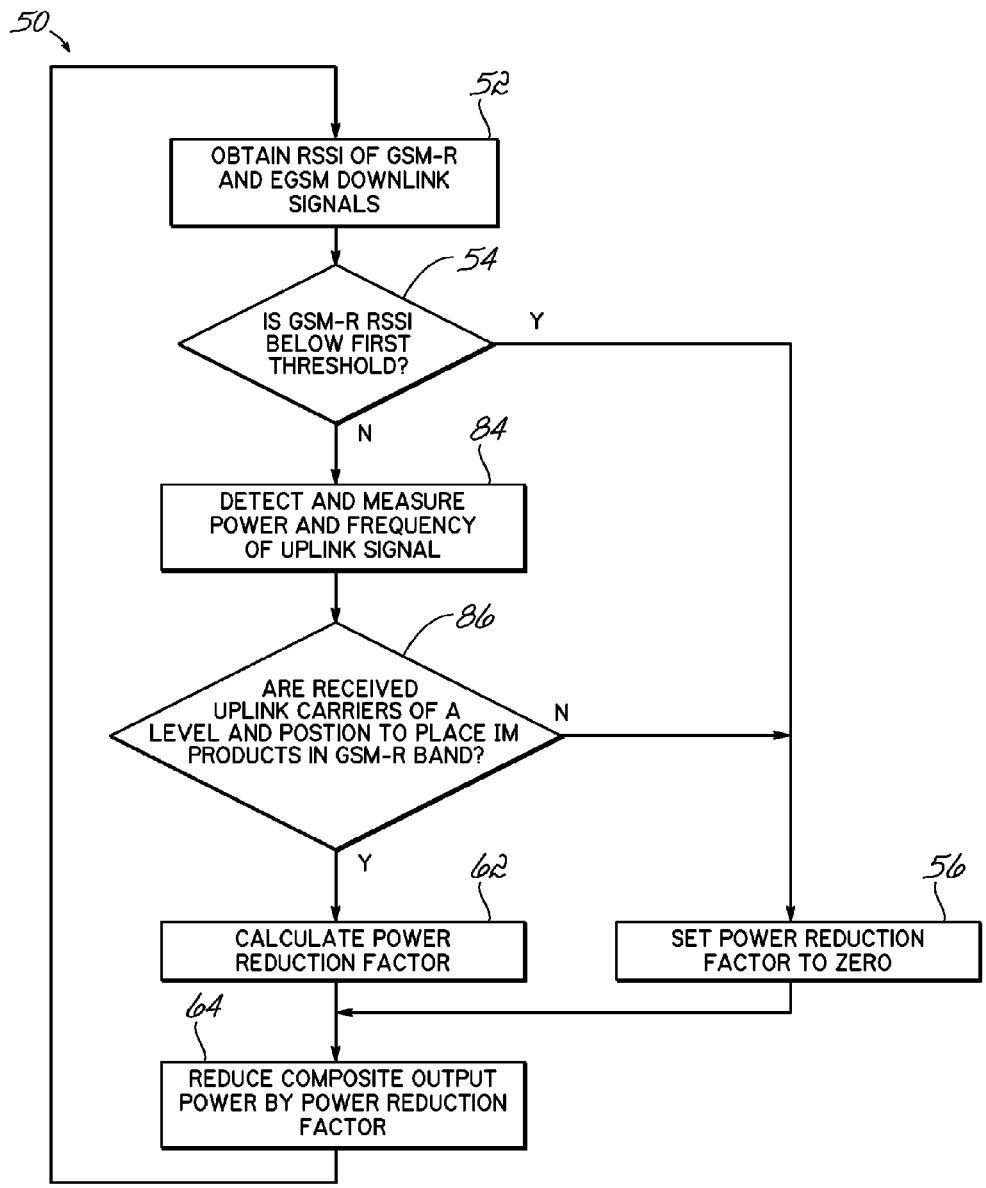
FIG. 3A is a flowchart illustrating an exemplary process for reducing the composite output power of the repeater system in FIG. 1 in response to measured RSSI signals in accordance with an embodiment of the invention.

In still another alternative embodiment as illustrated in FIGS. 2 and 3A, the monitored parameter is reflective of a property of the device, such as the frequency or power level of uplink signals from the device. To that end, a receiver might be added in the uplink path for detecting the RSSI in the uplink. In FIG. 2, receiver circuitry 35 is coupled in the uplink path of the repeater system such as to provide the RSSI's of the GSM-R and EGSM uplink signals to the controller circuitry 20. The RSSI levels may be provided to the controller circuitry 20 by the receiver circuitry 35, which may scan the entire GSM-R and EGSM bands at a rate that provides an adequate response time by the intelligent uplink power control feature of the invention. To this end, the receiver circuitry 35 may scan the GSM-R and EGSM bands every 150 mS. With the information from the receiver circuitry 35, the uplink signal power level is measured and the frequencies of the uplink carriers that are received can be determined. The controller circuitry then determines if the received uplink carriers are positioned in a way and/or are at such a power level so as to yield intermodulation products that can fall into a GSM-R uplink band.

Turning to FIG. 3A, when the GSM-R downlink RSSI exceeds the threshold (e.g., −30 dBm) indicating a close GSM-R BTS, a determination might then be made regarding the power and frequency or placement of the device uplink signals as noted in block 84. If the uplink carriers are of a high enough power level and positioned in a way as to produce or present intermodulation products in the uplink GSM-R frequency band (block 86), the power reduction factor might be implemented as noted in block 62. If the carriers are positioned in a way so that no uplink intermodulation products would be present in the GSMR uplink, then no power reduction is implemented (block 56).

As noted in block 62, the controller circuitry 20 determines or calculates the power reduction factor, in accordance with the invention. The power reduction factor is calculated in one embodiment based on the RSSI of the GSM-R downlink signal and is used to adjust the composite output power of the repeater system, which is represented by plot line 72. As the RSSI of the GSM-R downlink increases and then exceeds an interference threshold point, as indicated by the tests provided in FIG. 3, the power reduction factor will become non-zero, so that the composite output power of the EGSM signals of the repeater is reduced as represented by line segment 78. A typical interference threshold point might be about −37 dBm, so that the intelligent uplink power control will begin reducing the composite power when the GSM-R downlink RSSI reaches about −37 dBm, and meets the other criteria, as noted in FIG. 3. Because a one dB reduction in the composite output power 72 will result in a 3 dB reduction in the power of the third order products, the power reduction factor may be approximated by the equation:

$$P_{RF}=(P_{RSSI}-P_{TH})/3$$

where $P_{RF}$ is the power reduction factor in decibels, $P_{RSSI}$ is the RSSI of the GSM-R downlink signal in dBm, and $P_{TH}$ is the interference threshold point in dBm where the power adjustment of the invention begins. The power reduction factor may depend on the type of amplifier circuitry that is implemented in the repeater system. For example, a one dB reduction might be suitable for a Class A amplifier. However, different power reduction factors might be implemented for other amplifiers, such as amplifiers using a Feed Forward design or Pre-distortion.

As illustrated by line segment 78, in some embodiments of the invention, the composite power may be reduced incrementally or in steps to facilitate compatibility of the intelligent uplink power control feature with digital controller circuitry 20. Embodiments using a variable attenuator 46 that is a step attenuator may round the reduction factor $P_{RF}$ up to the nearest integer multiple of the minimum step of the step attenuator, which may be about 1 dB. The controller circuitry 20 may thereby reduce the composite output power by adjusting the variable attenuator 46 down in one dB steps for each 3 dB increase in the RSSI of the GSM-R downlink signal. However, in alternative embodiments of the invention, the composite output power of the repeater system 10 may be controlled by a continuously variable attenuator, or by any other suitable means such as by reducing the gain of the uplink amplifier circuitry 40.

Once the controller circuitry 20 has reduced the composite output power of the EGSM repeater signals by the power reduction factor, the controller circuitry 20 will return to block 52 where the process is repeated for continuous monitoring of potential interference scenarios. As the train moves closer to the GSM-R BTS, the RSSI of the downlink signals received from the GSM-R BTS will increase, as shown in FIG. 4, so that the RSSI value of the signals will then exceed the interference threshold point $P_{TH}$ by a greater amount. Thus, the repeater has to continue to adjust. In response to this increase in the RSSI of the GSM-R downlink signals, the controller circuitry 20 may increase the power reduction factor by about 1 dB for every 3 dB increase in RSSI value as represented by plot line segment 78 until a maximum value for the power reduction factor is reached. The resulting reduction in the composite output power of the repeater system thus, prevents desensitization of the GSM-R BTS.

The improvement in the desensitization may be seen by the divergence between plot lines 74 and 76. Plot line 74 represents the desensitization of the GSM-R BTS that occurs (for example for −40 dBm intermods) when the intelligent uplink power control feature of the invention is not used. That is, if the plot line 72 continued at its same level past $P_{TH}$ indicating that the repeater system 10 was continuing to provide a constant composite output power, regardless of the RSSI level of the GSM-R downlink signal, the desensitization of the GSM-R BTS would increase, as shown in plot line 74. In contrast, plot line 76 illustrates the desensitization of the GSM-R BTS with the intelligent uplink power control feature of the invention active. As the train moves closer to the GSM-R BTS, the downlink RSSI value measured by the receiver 33 may increase, but the reduction in output power of the EGSM repeater signal will maintain desensitization at a lower, manageable level. Therefore, rather than desensitization becoming significant, as indicated by point 80 of plot line 74, it will be managed and not significantly increase with increasing downlink RSSI of the GSM-R signal, until the output power reduction is maximized or exhausted and the repeater output level again is constant for the increasing downlink RSSI of the GSM-R signal, as indicated by point 82 of plot line 76.

Referring again to FIG. 4, where the intelligent uplink power control feature is active, at the point ($P_{TH}$) where the GSM-R BTS is about to be desensitized by the repeater system 10, the controller circuitry 20 begins reducing the composite output power level for the repeater system 10, as illustrated by line segment 78. Because the interference is the result of third order products, for every 1 dB reduction in the composite output power, the power level of the spurious signals will drop about 3 dB. Thus, the reduction in the output power of the spurious repeater output signals will track the reduction in path loss between the repeater system 10 and the GSM-R BTS (increasing GSM-R RSSI value). The level of the spurious signals at the GSM-R BTS is thus maintained at a relatively constant and reduced level just below that which might cause desensitization of the GSM-R BTS. The desensitization of the GSM-R BTS is thus significantly reduced or eliminated by the operation of the intelligent uplink power control feature of the invention, as indicated by plot line 76 versus plot line 74. The intelligent uplink power control thereby maintains the composite output power of the repeater system 10 at the maximum possible level without causing desensitization of the GSM-R BTS.

Although the RSSI value associated with the signal paths from the noted base stations is set forth as some of the monitored parameters herein in the disclosed example, other parameters might be monitored that are reflective of a property of one or more signal sources or a device. For example, other parameters might be monitored that are reflective of a property of the signal source that includes the proximity or closeness or location of a signal source, such as a BTS, the downlink or uplink signal strength of signals from the signal source, and/or path losses associated with the signal source and the repeater system might also be monitored in the invention. As such, the present invention and the implementation of the intelligent uplink power control of a mobile repeater is not limited to simply monitoring RSSI values as the monitored parameter to indicate a property of the signal sources, such as a base station or a device, such as a mobile device. To that end, other thresholds might be developed for other signal strength indicators or BTS parameters that might be monitored in accordance with the invention to determine when to activate the intelligent uplink power control feature of the invention for a repeater system.

Although the disclosure herein discusses use of the invention with regard to a repeater system installed on a train, these same methods can be applied to base stations, distributed antenna systems, and other types of RF transceivers and communication systems that operate in mobile environments.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A repeater system, comprising:
operational circuitry configured to repeat signals between at least one device and at least one signal source, the operational circuitry including receiver circuitry configured to receive downlink signals from a plurality of signal sources and to receive uplink signals from at least one device and transmitter circuitry configured to transmit uplink signals to at least one signal source;
controller circuitry configured to control the transmitter circuitry and to monitor at least one downlink signal parameter from a plurality of signal sources and at least one uplink signal parameter from the device, the controller circuitry further configured to use the monitored parameters to determine whether transmitted uplink signals will desensitize the operation of at least one of the plurality of signal sources and to adjust the power level of the transmitted uplink signals to avoid desensitization.

2. The repeater system of claim 1, wherein at least one monitored signal parameter is reflective of a property of the signal source that includes at least one of a location of the signal source with respect to the repeater system, or a path loss between the repeater system and the signal source or a strength of a downlink signal received from the signal source.

3. The repeater system of claim 1, wherein at least one monitored downlink signal parameter is a received signal strength indicator (RSSI) value associated with a downlink signal from at least one of the plurality of signal sources.

4. The repeater system of claim 3, wherein the controller circuitry is further configured to compare the RSSI value to a threshold and to reduce the power level of the transmitted uplink signals in response to the RSSI value exceeding the threshold.

5. The repeater system of claim 1, wherein the at least one monitored downlink signal parameter is reflective of the strength of the downlink signal and the controller circuitry is configured to determine a comparison value that includes a difference value that reflects the difference between the downlink signal parameters associated with the downlink signals from the plurality of signal sources and compare the difference value to a threshold, wherein the controller circuitry is further configured to adjust the power level of the transmitted uplink signals in response to the comparison to the threshold.

6. The repeater system of claim 1, wherein the controller circuitry is configured to reduce the power level of the transmitted uplink signals.

7. The repeater system of claim 1, wherein at least one monitored uplink signal parameter is reflective of a property of the device that includes at least one of the frequency of uplink signals from the device or the power level of uplink signals from the device.

8. The repeater system of claim 7, wherein the controller circuitry is configured to determine if the frequency and power level of uplink signals from the device will yield intermodulation products that fall within a frequency band of at least one of the signal sources.

9. The repeater system of claim 1, wherein the power level is adjusted by a power reduction factor determined by the controller circuitry.

10. The repeater system of claim 1, wherein the power level is reduced incrementally.

11. The repeater system of claim 1, wherein at least one signal source is an EGSM signal source and at least one signal source is a GSM-R signal source.

12. A method of repeating signals between at least one device and at least one signal source, the method comprising:
receiving downlink signals from a plurality of signal sources and uplink signals from at least one device and transmitting uplink signals to at least one signal source;
monitoring at least one downlink signal parameter from a plurality of signal sources and at least one uplink signal parameter from the device;
using the monitored parameters to determine whether transmitted uplink signals will desensitize the operation of at least one of the plurality of signal sources; and
adjusting the power level of the transmitted uplink signals to avoid desensitization.

13. The method of claim 12, wherein at least one monitored signal parameter is reflective of a property of the signal source that includes at least one of a location of the signal source with respect to the repeater system, or a path loss between the repeater system and the signal source or a strength of a downlink signal received from the signal source.

14. The method of claim 12, further comprising monitoring a received signal strength indicator (RSSI) value associated with a downlink signal from at least one of the plurality of signal sources.

15. The method of claim 14, further comprising comparing the RSSI value to a threshold and reducing the power level of the transmitted uplink signals in response to the RSSI value exceeding the threshold.

16. The method of claim 12, wherein the power level is reduced incrementally.

17. The method of claim 12, wherein the at least one monitored downlink signal parameter is reflective of the strength of the downlink signal and further comprising:
determining a comparison value that includes a difference value that reflects the difference between the downlink signal parameters associated with the downlink signals from the plurality of signal sources;
comparing the difference value to a threshold; and
adjusting the power level of the transmitted uplink signals in response comparison to the threshold.

18. The method of claim 12, wherein at least one monitored uplink signal parameter is reflective of a property of the device that includes at least one of the frequency of uplink signals from the device or the power level of uplink signals from the device, the method further comprising determining if the frequency and power level of uplink signals from the device will yield intermodulation products that fall within a frequency band of at least one of the signal sources.

19. The method of claim 12, wherein at least one signal source is an EGSM signal source and at least one signal source is a GSM-R signal source.

20. The method of claim 12, wherein the power level is adjusted by a power reduction factor determined by controller circuitry.

* * * * *